(12) United States Patent
Gilbertson et al.

(10) Patent No.: US 9,604,389 B2
(45) Date of Patent: Mar. 28, 2017

(54) PI-SHAPED PREFORM WITH BIAS FIBERS

(75) Inventors: Brock Gilbertson, Dover, NH (US); Jonathan Goering, York, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 55 days.

(21) Appl. No.: 13/399,761

(22) Filed: Feb. 17, 2012

(65) Prior Publication Data

US 2013/0216770 A1    Aug. 22, 2013

(51) Int. Cl.

| | | |
|---|---|---|
| *D03D 3/00* | (2006.01) | |
| *B31B 1/26* | (2006.01) | |
| *D06H 7/00* | (2006.01) | |
| *D03D 1/00* | (2006.01) | |
| *D03D 11/00* | (2006.01) | |
| *B29B 11/16* | (2006.01) | |
| *D03D 11/02* | (2006.01) | |
| *D03D 25/00* | (2006.01) | |
| *B29C 70/24* | (2006.01) | |

(52) U.S. Cl.
CPC .............. *B29B 11/16* (2013.01); *D03D 1/00* (2013.01); *D03D 11/02* (2013.01); *D03D 25/005* (2013.01); *B29C 70/24* (2013.01); *D10B 2101/12* (2013.01); *D10B 2505/02* (2013.01); *Y10T 428/2419* (2015.01); *Y10T 442/3203* (2015.04)

(58) Field of Classification Search
None
See application file for complete search history.

(56) References Cited

U.S. PATENT DOCUMENTS

| | | |
|---|---|---|
| 4,256,790 A | 3/1981 | Lackman et al. |
| 4,331,495 A | 5/1982 | Lackman et al. |
| 5,429,853 A | 7/1995 | Darrieux |
| 6,103,337 A | 8/2000 | Burgess |
| 6,446,675 B1 | 9/2002 | Goering |
| 6,520,706 B1* | 2/2003 | McKague et al. ............. 428/57 |
| 6,712,099 B2 | 3/2004 | Schmidt et al. |
| 6,874,543 B2 | 4/2005 | Schmidt et al. |
| 2002/0069927 A1* | 6/2002 | Bryn et al. ................... 139/48 |
| 2005/0274426 A1 | 12/2005 | Nayfeh et al. |

(Continued)

FOREIGN PATENT DOCUMENTS

| | | |
|---|---|---|
| WO | WO-03/023104 A | 3/2003 |
| WO | WO-2009/064594 A | 5/2009 |

OTHER PUBLICATIONS

International Search Report and Written Opinion issued by European Patent Office acting as the International Searching Authority for related application PCT/US2013/025911 mailed Aug. 2, 2013.

*Primary Examiner* — David Sample
*Assistant Examiner* — Donald M Flores, Jr.
(74) *Attorney, Agent, or Firm* — McCarter & English LLP

(57) ABSTRACT

A woven preform for a reinforced composite material, which may be woven flat and folded into shape. The preform has off-axis reinforcement with one or more legs and/or base extending in an off axis or bias (non 0/90 degree) orientation with respect to the warp/weft fibers. One or more legs extend from a base, the base and legs each having at least two layers of warp fibers. The legs may be parallel or angled to each other. The outer ends of the base and/or the legs may have tapers formed from terminating layers of warp fibers in a stepped or angled pattern.

26 Claims, 8 Drawing Sheets

(56) References Cited

U.S. PATENT DOCUMENTS

2009/0247034 A1    10/2009   Goering et al.
2010/0105268 A1     4/2010   Ouellette et al.
2010/0105269 A1*   4/2010   Goering et al. ............. 442/205
2010/0167007 A1*   7/2010   Goering ....................... 428/124

* cited by examiner (PRIOR ART)

PI-SHAPED PREFORM WITH BIAS FIBERS

BACKGROUND OF THE INVENTION

Field of the Invention

This invention generally relates to woven preforms and particularly relates to woven preforms used in reinforced composite materials, which can be woven flat and folded into its final shape.

Incorporation by Reference

All patents, patent applications, documents, references, manufacturer's instructions, descriptions, product specifications, and product sheets for any products mentioned herein are incorporated herein by reference, and may be employed in the practice of the invention.

Description of the Prior Art

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, recreational (as in racing boats and autos), and other applications.

Typically such components consist of reinforcement materials embedded in matrix materials. The reinforcement component may be made from materials such as glass, carbon, ceramic, aramid, polyethylene, and/or other materials which exhibit desired physical, thermal, chemical and/or other properties, chief among which is great strength against stress failure. Through the use of such reinforcement materials, which ultimately become a constituent element of the completed component, the desired characteristics of the reinforcement materials, such as very high strength, are imparted to the completed composite component. The constituent reinforcement materials typically, may be woven, knitted or otherwise oriented into desired configurations and shapes for reinforcement preforms. Usually particular attention is paid to ensure the optimum utilization of the properties for which the constituent reinforcing materials have been selected. Usually such reinforcement preforms are combined with matrix material to form desired finished components or to produce working stock for the ultimate production of finished components.

After the desired reinforcement preform has been constructed, the preform may be impregnated in the matrix material, so that typically the reinforcement preform becomes encased in the matrix material and matrix material fills the interstitial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical, and/or other properties. The materials chosen for use as the matrix may or may not be the same as that of the reinforcement preform and may or may not have comparable physical, chemical, thermal or other properties. Typically, however, they will not be of the same materials or have comparable physical, chemical thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each other. Usual purposes for such angular arrangements of joined reinforcement preforms are to create a desired shape to form a reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible. Given the desired very high strength of the reinforcement preform constituents per se, weakness of the juncture becomes, effectively, a "weak link" in a structural "chain."

An example of an intersecting configuration is set forth in U.S. Pat. No. 6,103,337, the disclosure of which is incorporated herein by reference. This reference sets forth an effective means of joining together two reinforcing plates into a T-form.

Various other proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the joint is that of the adhesive and not of the matrix material.

The use of metal bolts or rivets at the interface of such components is unacceptable because such additions at least partially destroy and weaken the integrity of composite structures themselves, add weight, and introduce differences in the coefficient of thermal expansion as between such elements and the surrounding material.

Other approaches to solving this problem have been based on the concept of introducing high strength fibers across the joint area through the use of such methods as stitching one of the components to the other and relying upon the stitching thread to introduce such strengthening fibers into and across the juncture site. One such approach is shown in U.S. Pat. No. 4,331,495 and its divisional counterpart, U.S. Pat. No. 4,256,790. These patents disclose junctures having been made between a first and second composite panel made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured," i.e. cured simultaneously. Another method to improve upon junction strength is set forth in U.S. Pat. No. 5,429,853.

While the prior art has sought to improve upon the structural integrity of the reinforced composite and has achieved success, particularly in the case of U.S. Pat. No. 6,103,337, there exists a desire to improve thereon or address the problem through an approach different from the use of adhesives or mechanical coupling. In this regard, one approach might be by creating a woven three dimensional ("3D") structure by specialized machines. However, the expense involved is considerable and rarely is it desirable to have a weaving machine directed to creating a simple structure. Despite this fact, 3D preforms which can be processed into fiber reinforced composite components are desirable because they provide increased strength relative to conventional two dimensional laminated composites. These preforms are particularly useful in applications that require the composite to carry out-of-plane loads. However, the prior-art preforms discussed above have been limited in their ability to withstand high out-of-plane loads, to be woven in an automated loom process, and to provide for varying thickness of portions of the preform.

Another approach would be to weave a two dimensional ("2D") structure and to fold it into 3D shape. Fiber preforms with specific structural shapes, such as for example 'T', 'I', 'H' or 'Pi' cross sections, can be woven on a conventional shuttle loom, and several existing patents describe the method of weaving such structures (U.S. Pat. Nos. 6,446,675, 6,712,099, and 6,874,543, for example).

Many composite structures utilize Pi shaped preforms to join two or more perpendicular composite panels. A cross-sectional view of a typical Pi-shaped preform 100 is shown in FIG. 1, for example. The preform typically has two upstanding legs 125, 135 in the vertical position, forming a clevis 116 between legs 125, 135. However, the legs 125, 135 may be perpendicular or non-perpendicular or angled to base 120. Preform 100 is woven by repeating the complete weave sequence to form adjacent vertical sections along the longitudinal length of preform 100. The weave process produces continuous lengths of preform 100, which are then cut to the desired lengths for installation.

In aircraft construction, the use of Pi preforms has proven to be an effective way to transfer loads from one component, for example, the web of the frame or spar, into another component, for example, a fuselage or wing skin. This is especially true for structures that subject the Pi to axial tension/compression, pull-off, and/or side bending loads.

In many applications, the Pi preform has to transfer shear loads between the two components, such as that shown in FIG. 2, for example. FIG. 2 depicts a T-shear loading configuration, wherein Pi preform 100 is used to join perpendicular panels 30, 40, for example, and the shear load 50 is being applied in an opposite direction indicated using bold arrows. In such a configuration, the traditional Pi, however, is not nearly as efficient for this type of loading as it is for the other load cases. The traditional Pi preform has reinforcement along the length of the preform (axially) and in the transverse direction (along the width of the base and along the height of the upstanding legs). This type of fiber orientation in a structure is commonly referred to as 0, +/−90 degree orientation. This type of orientation provides fiber that is parallel to the principal loading directions for the axial, pull off, and side bending cases. However, it does not provide any fiber in the off axis directions that are important for carrying shear loads as described in FIG. 2 above.

SUMMARY OF THE INVENTION

Accordingly, an object of the present invention is to provide a woven preform that can transfer shear loads uniformly between two or more perpendicularly joined components.

Another object is to provide a woven Pi preform that has fiber reinforcement in an off axis or bias direction (any non 0/90 degree direction, and commonly but not limited to +/−45 degree direction), which is important for carrying shear loads in some composite structures.

It is a further object of the invention to provide for a woven preform which is of a design which is an alternative to and/or an improvement on existing preforms and/or reinforced composite structures heretofore available.

Accordingly, one embodiment of the present invention is method of forming a woven preform, for example a Pi preform, including the steps of: providing a first layer of warp fibers, providing a second layer of warp fibers parallel to the first layer of warp fibers, and providing one or more layers of weft fibers, wherein the weft fibers are perpendicular to the warp fibers in the first layer and the second layer, interweaving the well fibers with the warp fibers of the first layer and the second layer to form a multilayer preform, wherein the warp fibers in the first layer exchange positions with warp fibers in the second layer to form a clevis of a predetermined width, wherein the warp fibers and the weft fibers are at a bias (non 0/90 degree) angle with respect to the clevis of the preform.

Another embodiment of the present invention is a woven preform for use in reinforced composite structures, the preform includes a first layer of warp fibers, a second layer of warp fibers parallel to the first layer of warp fibers, and one or more layers of weft fibers, wherein the weft fibers are perpendicular to the warp fibers in the first layer and the second layer, wherein the weft fibers are interwoven with the warp fibers of the first layer and the second layer to form a multilayer preform, wherein the warp fibers in the first layer exchange positions with warp fibers in the second layer to form a clevis of a predetermined width, wherein the warp fibers and the weft fibers are at a bias (non 0/90 degree) angle with respect to the clevis of the preform. The preform can be a Pi preform having a base and two upstanding legs, wherein the base and the legs are integrally woven, and said preform has off-axis reinforcement in the bias (non 0/90 degree) angle.

Although Pi preforms are discussed in detail herein, the instant method can be used for making other cross-sectional shapes such as a 'T' shape or 'T' stiffener that has the blade of the 'T' running perpendicular to the top of the 'T' or other shapes such as preforms having three or more legs, or 'H' and 'I' shaped preforms.

The instant method can be used to weave preforms with variable thickness or variable length or height legs that may be parallel or angled to each other. The legs of the preform may be linear or non-linear along the length of the preform. For example, the legs of the preform may have a sinusoidal, zig-zag, stepped, or wavy configuration. The legs of the preform may be separated by a uniform width clevis or a variable width clevis. The preform can be woven using any convenient pattern for the warp fiber, i.e., ply-to-ply, through thickness angle interlock, orthogonal, etc. While carbon fiber is preferred, the invention is applicable to practically any other fiber type, such as for example, glass, ceramic, aramid, polyethylene, polypropylene etc, or combinations thereof.

The preform according to the present invention is for mechanical or structural joints having a three-dimensional weave architecture with weft fibers woven to provide layer-to-layer interlocking of layers of warp fiber as well as interlocking of fibers within each layer. Although exemplary embodiments described herein involve layer-to-layer interlocking, this is not necessary for the practice of the invention. Some of the layers of the preform may be without layer-to-layer interlocking. The woven preform transfers out-of-plane loading through directed fibers to minimize inter-laminar tension. The preform has a base and one or more legs extending from the base, the base and one or more legs each having at least one layer of warp fibers. In preforms with two or more layers of warp fibers, the outer ends of the base and/or the legs can have tapering edges formed from terminating layers of warp fibers in a stepped pattern, for example.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

The terms "fibers" and "yarns" are interchangeably used in the following description. However, "fibers" and "yarns" as used herein can refer to monofilaments, multifilament yarns, twisted yarns, multifilament tows, textured yarns, braided tows, coated yarns, bicomponent monofilament yarns, as well as yarns made from stretch broken fibers.

Figure 4:
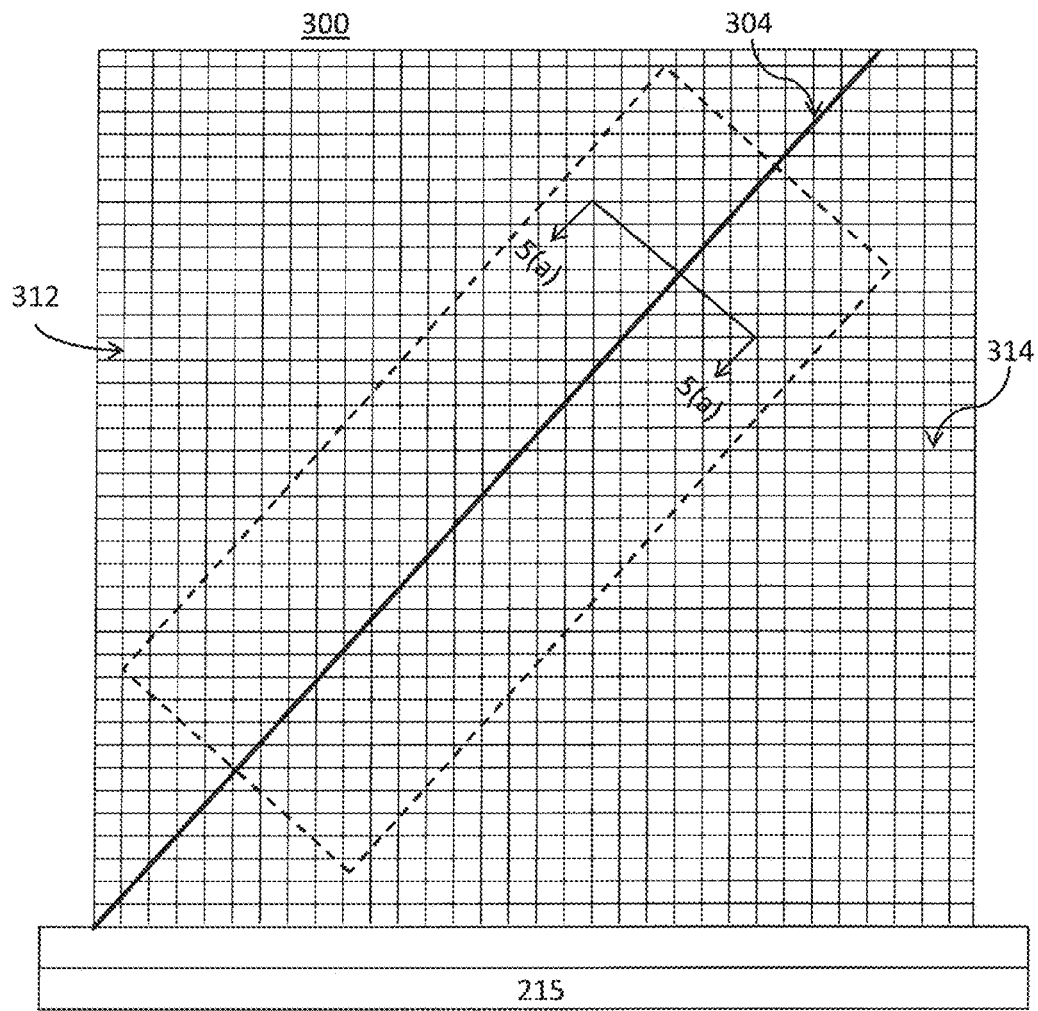
FIG. 4 is illustrating a step involved in a method for making a woven preform, according to one exemplary embodiment of the invention.

Turning now to FIG. 4, the Pi preform 300 according to the present invention can be woven on any conventional weaving machine 215. FIG. 4, for example, is a top view of a weaving machine 215 with the preform 300 still on the machine in an "as-woven" form before the woven fabric is taken off the loom. The vertical lines in fabric 300 represent warp fibers or yarns 312, and the horizontal lines represent weft fibers or yarns 314. While carbon fiber is preferred, the warp and/or weft fibers can practically be any other fiber type, such as for example, glass, ceramic, aramid, polyethylene, polypropylene etc, or a combination thereof.

Preform 300 is woven with at least two layers of warp fibers 312 and at least one layer of weft fiber 314. While a plain weave is a common pattern, any weave pattern known to one of ordinary skill in the art may be used in the practice of the invention, so long as the fibers are oriented in a bias (non 0/90 degree) angle with respect to the legs of the preform. The weave architecture itself can be any of those disclosed in U.S. Pat. Nos. 6,446,675, 6,712,099, 6,874,543, 7,712,488 and 8,079,387, the entire contents of which is incorporated herein by reference.

Figure 7A:
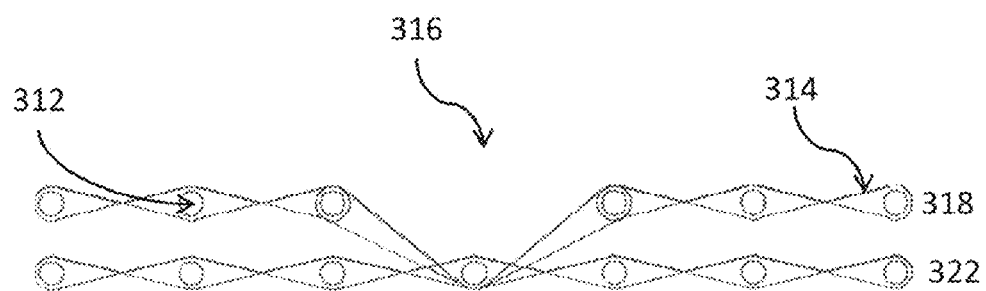
FIGS. 7(a), 7(b), & 7(c) are schematic views of the warp and weft yarn paths of a woven Pi-shaped preform, according to one exemplary embodiment of the invention.

Warp fibers 312 in preform 300 are generally parallel to each other, with slight undulations along the longitudinal length of each fiber, and are arranged in generally vertical columns. Weft fiber 314 interweaves with both layers of warp fibers 312 to form a preform as shown in FIG. 4. The dark diagonal line across preform 300 represents an intersection juncture 304 where warp fibers 312 and weft fibers 314 from a top layer 318 of the fabric exchange positions with warp fibers 312 and weft fibers 314 from the bottom layer 322, such as that shown in FIG. 7(a), for example. Enacting the exchange point in advancing weft columns 314 for advancing warp columns 312 during weaving results in what is referred to herein as a "bias" Pi preform, which has reinforcement at a bias angle relative to juncture 304. Although FIG. 4 shows only one diagonal across the width of the preform 300, any number of junctions can be formed across the width of the preform, depending on the required size of the final Pi preform. Similarly, although FIG. 4 illustrates the junction being formed at a +/−45 degree angle relative to the warp and weft yarns, the invention is not limited as such, i.e. the junction can be formed at any angle other than the conventional 0, +/−90 degree orientation. For example, the junction can be formed at a +35/−55 angle or vice versa. It should be noted that the angle of orientation of reinforcement can depend on the direction of load the final Pi preform is exposed to.

Figure 5A:
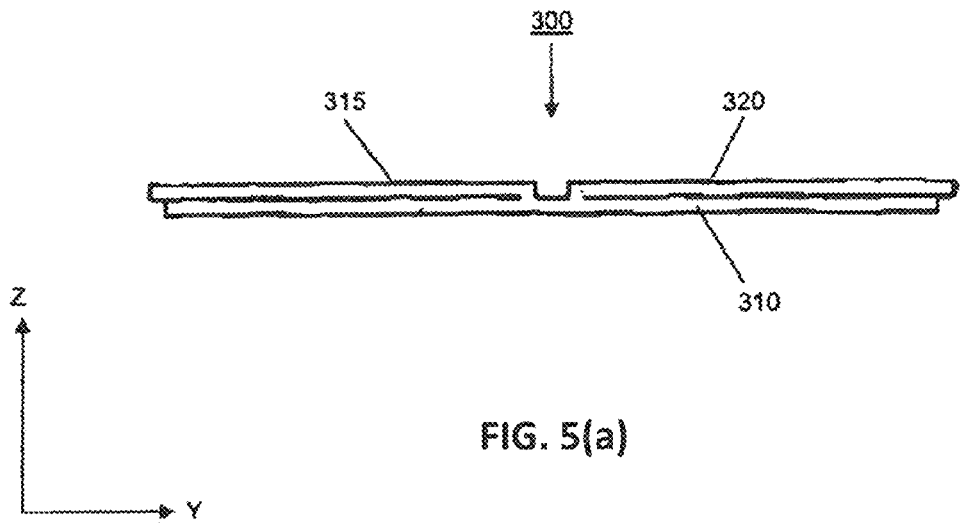
FIG. 5(a) is schematic cross-sectional view of a Pi-shaped preform along the line 5(a)-(a) in FIG. 4 formed according to one exemplary embodiment of the invention.
Figure 5B:
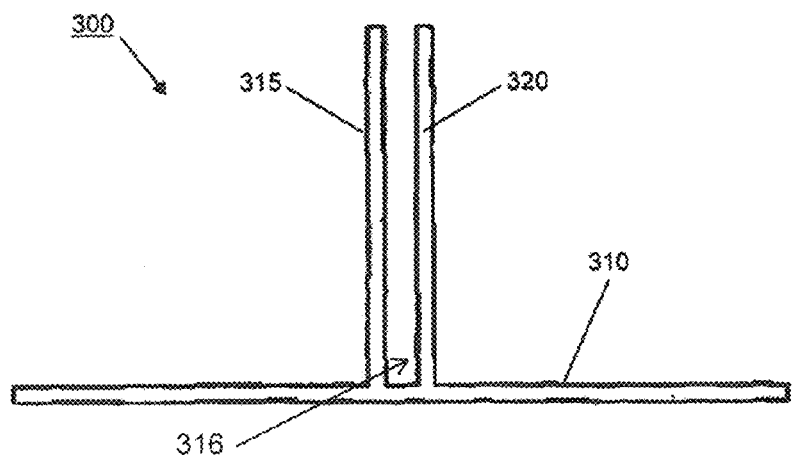
FIG. 5(b) is schematic cross-sectional view of a Pi-shaped preform, according to one exemplary embodiment of the invention.
Figure 7B:
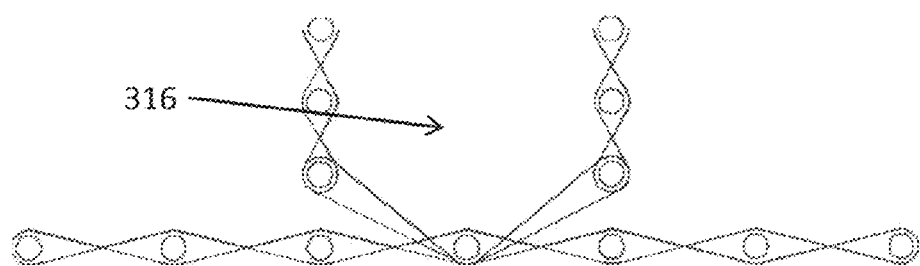

After weaving preform 300, the woven material is taken off the loom or weaving machine and cut into strips on a bias to the length and width of the preform, as shown using the dotted line in FIG. 4, for example. The dotted line is merely used as an example, and the actual size and shape of the preform being cut can vary depending on the end use for the structure. After the ends are cut to length, the Pi preform has the traditional shape, but the reinforcement is on the bias. After cutting into desired size strips, the preform is still flat as shown in FIG. 5(a), like the traditional as-woven Pi preform. The top layer warp fibers 312 on either sides of the clevis 316 (the space between the upstanding legs) are indicated as 315 and 320, which now form the material for the upstanding legs, and the bottom layer warp fibers of the woven preform, which form the base of the bias Pi preform are indicated as 310. After the material strips are cut off from woven preform 300, the legs 315, 320 of the bias Pi preform 300 can be formed by lifting the material on either sides of the clevis 216, as shown in FIG. 5(b), for example. The legs 315, 320 may be perpendicular or non-perpendicular or angled to the base 310. Base 310 and legs 315, 320 each comprise at least one layer of warp fibers 312 and can have optional tapered edges if there are two or more layers of warp fibers. Although a single layer construction is illustrated for the base and the legs in FIGS. 7(a) and 7(b) and the above example, the invention may not be limited as such, as any number of layers may be used for the base and legs. For example, if a thicker base is desired, then the base can include two or more layers of warp fibers, and if thickness is needed in the legs, then each of the legs can include two or more layers of warp fibers.

Figure 1:
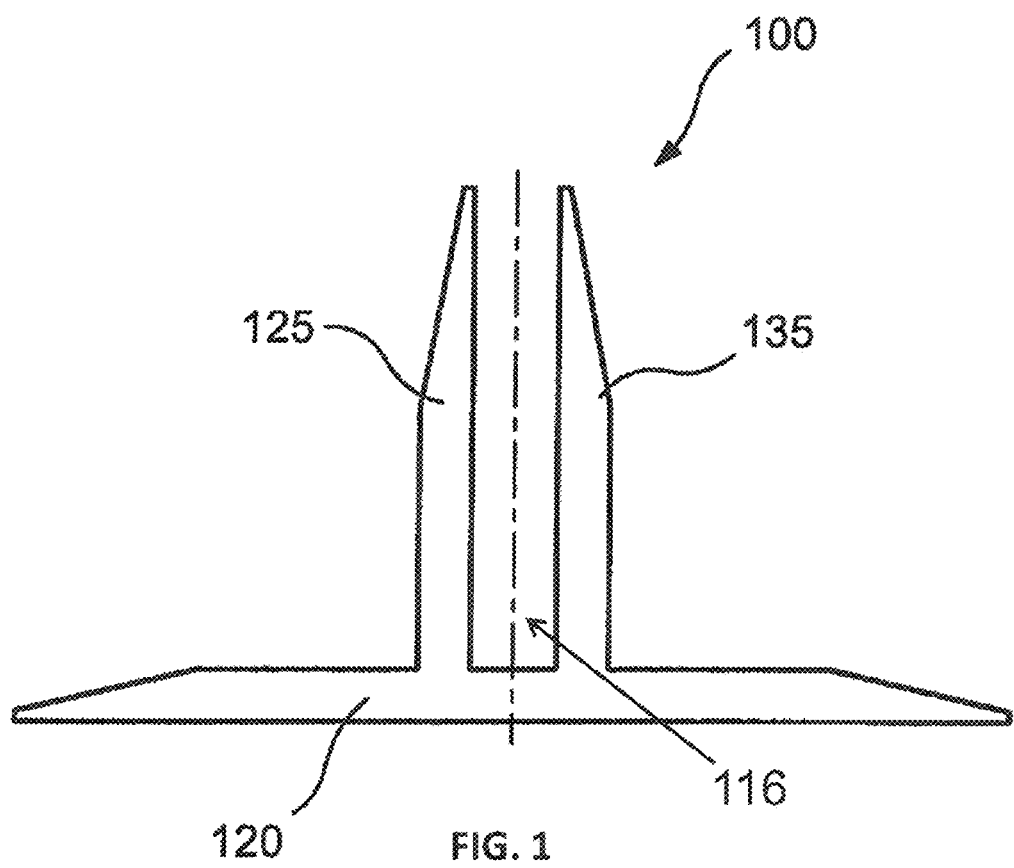
FIG. 1 is a schematic end view of a conventional Pi-shaped preform.
Figure 2:
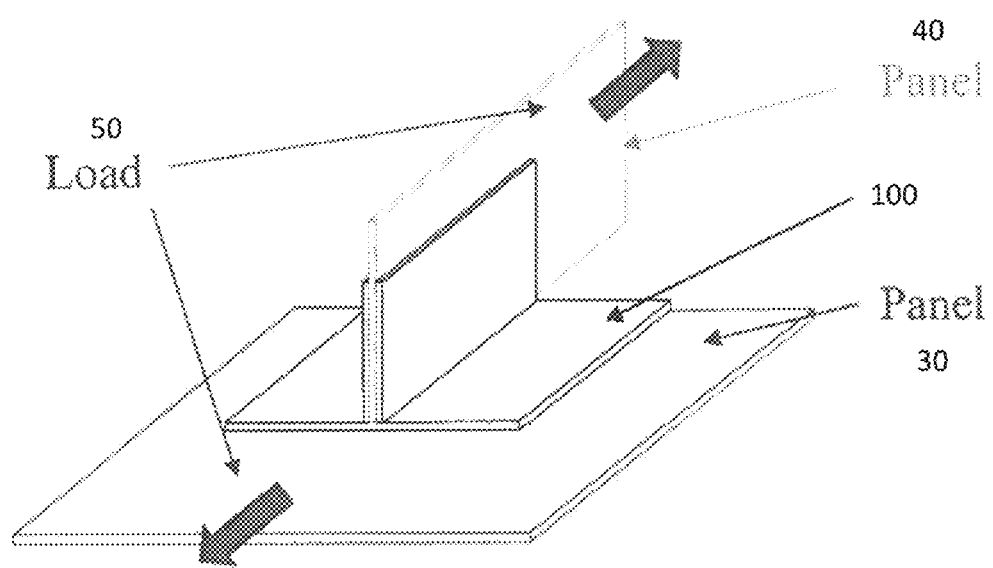
FIG. 2 is a schematic of a T-shear loading configuration in an exemplary composite structure.
Figure 3:
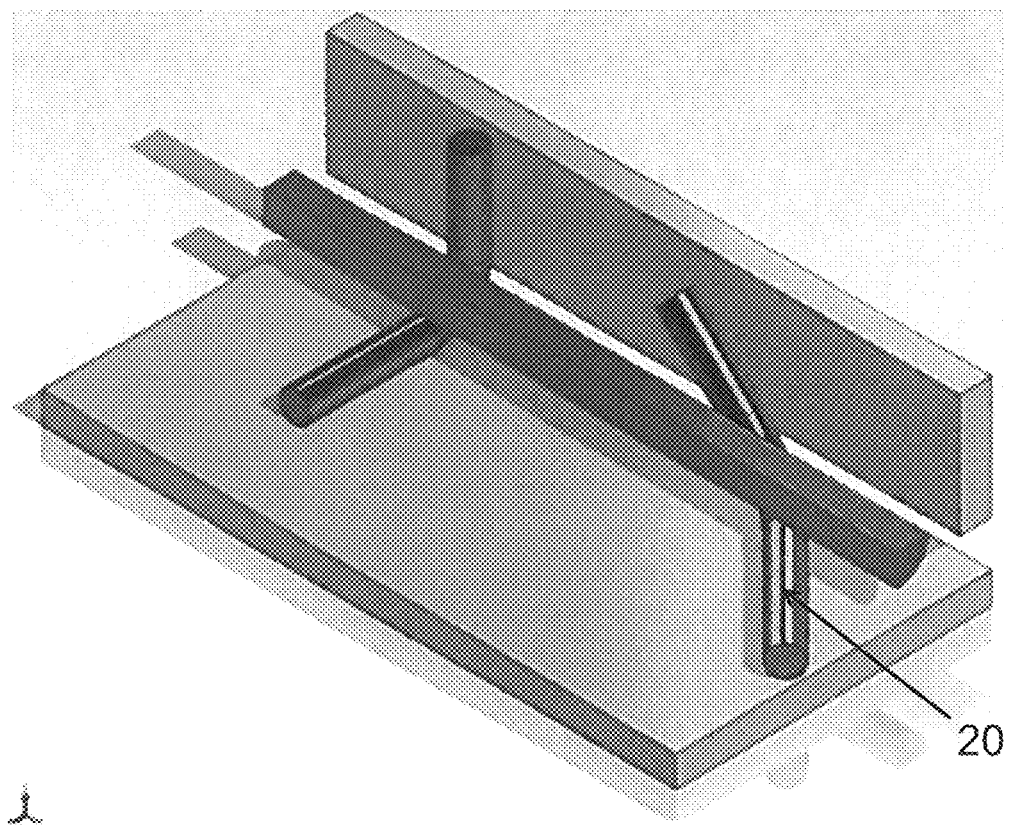
FIG. 3 is an illustration of bending radius to which fibers must conform when placed in a molding tool.
Figure 6:
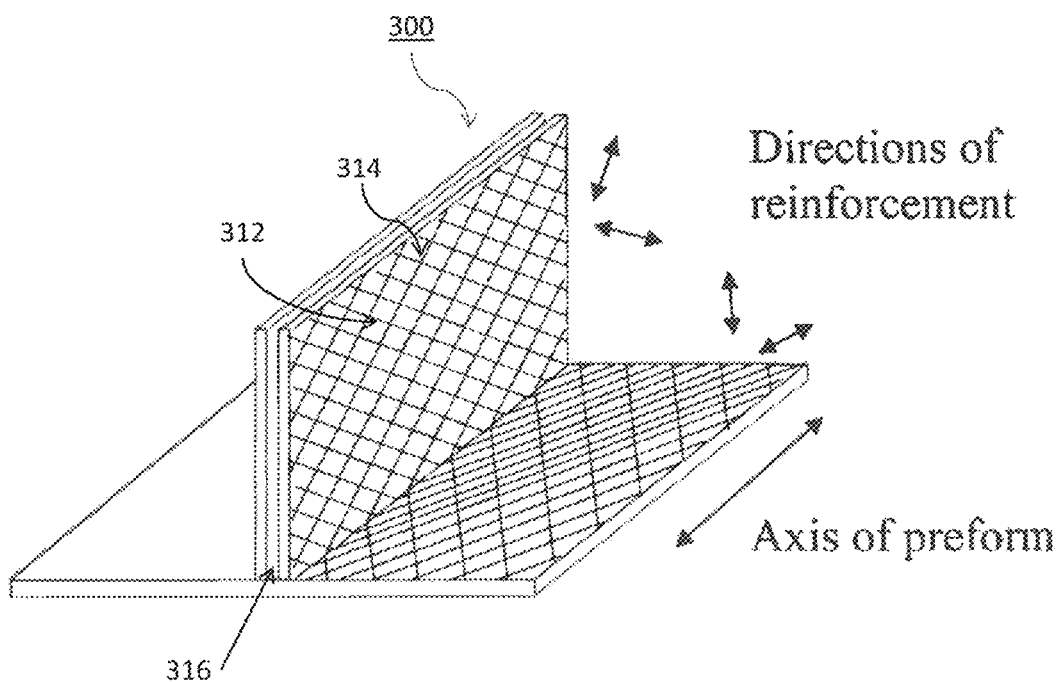
FIG. 6 is a schematic profile view of a woven Pi preform in an upstanding position and off-axis reinforcement, according to one exemplary embodiment of the invention.
Figure 7C:
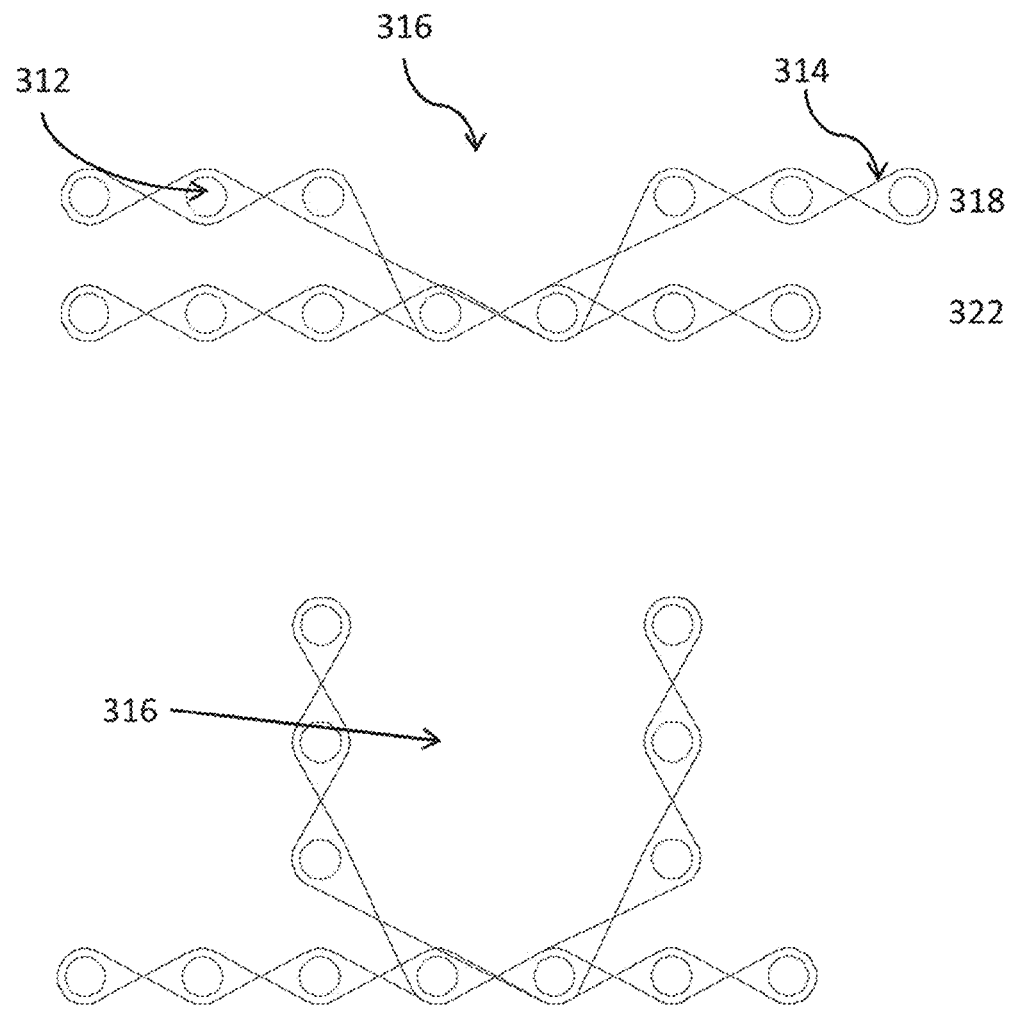

The bias Pi preform 300 in the present invention is woven by designing the intersection junction of the upstanding legs and the base to be at a non-zero angle relative to the warp direction of the woven fabric. This junction can be wider than just one warp yarn, and can be several, again depending upon the final use of the Pi preform as shown in FIG. 7(c). The bias Pi preform according to the present invention has reinforcement at a bias angle relative to the clevis direction of the preform, such as that shown in FIG. 6, for example, thereby providing a component of reinforcement in the direction of shear loading. Furthermore, the effective radius of the fiber reinforcement can be larger at the intersection junction of the base and the upstanding legs, as can be seen in FIG. 3, for example. When confining a fiber into an edge, as in a molding tool, the radius that the fiber must conform to will influence the amount of fiber damage and residual strength of the Pi preform. The fiber that is bent perpendicularly to the edge is forced into a smaller radius bend than the fiber 20 that is on a bias to the edge. The radius is increased by a factor of two for the bias Pi preform of the present invention, and a larger radius is less susceptible to fiber fracture, thereby making more effective use of the properties of the fiber.

It should be noted that although all warp fibers are drawn to have the same diameter, the invention is not limited as such. For example, warp fibers in the base can have a smaller cross-sectional area than warp fibers in legs.

Tapered edges can be formed on an outer edge of a preform by terminating successive layers, for example, by cutting at an angle the warp and/weft fibers at lengths that are shorter than prior layers. For example, edges of both the legs 315, 320 and/or the edges of the base 310 can have tapered edges. A bias Pi preform having tapered edges in either the base or upstanding legs has a better resistance to peel loads than a preform in which the warp-fiber layers all terminate at the same length. In addition, use of a smaller fiber size for the warp taper fiber provides a smoother, more gradual transition from the preform to a component to which it is joined.

The invention according to one exemplary embodiment is a method for weaving a preform with multiple legs 315, 320 such that these legs are not necessarily linear in the bias (non 0/90 degree) direction. In one exemplary embodiment, the legs may move in a sinusoidal, zig-zag, diagonal, curved or non-linear fashion or a combination thereof in the bias (non 0/90 degree) direction. The width of the clevis 316 may also vary along its length depending on the application. In some instances, the preform may have a zero width clevis, i.e. the layers that form the preform may intersect each other at locations where they interchange positions. The shift in the position of the legs, according to this embodiment, may be achieved by selectively dropping some warp and/or weft fibers out of the parts of the preform that form the upstanding legs 315, 320, while simultaneously adding warp fibers and/or weft fiber in other areas. In such a case, the warp fibers may be used provide layer-to-layer interlocking instead of the weft fibers. Some of the layers of the preform may be without layer-to-layer interlocking.

Although a plain weave is the preferred pattern for weaving the preform according to the present invention, any weave pattern known to one of ordinary skill in the art may be used in the practice of the invention, so long as the fibers are oriented in the bias (non 0/90 degree) angle with respect to the legs of the Pi preform. The weave architecture itself can be any of those disclosed in U.S. Pat. Nos. 6,446,675, 6,712,099, 6,874,543, 7,712,488 and 8,079,387, the entire contents of which is incorporated herein by reference.

Although FIG. 7 illustrates an embodiment of the bias Pi preform described herein with the weft fiber 314 exchanging between layers 318 and 322, the subject invention also applies to exchanging warp fiber 312 between layers 318 and 322, as well as both warp and weft fibers exchanging between layers.

Preforms such as this may be used in composite structures to reinforce joints and to build preforms for more complicated structures such as spars and ribs in aircraft. The Pi preform formed according to the present invention can transfer shear loads uniformly between two or more perpendicularly joined components. It has fiber reinforcement in the off axis or bias (non 0/90 degree) direction, which is very important for withstanding shear loads in some composite structures.

The instant method can also be used for making other cross-sectional shapes such as a 'T' shape or 'T' stiffener that has the blade of the 'T' running in a sinusoidal fashion relative to the top of the 'T' or other shapes such as preforms having three or more legs or having an 'I' or 'H' shape configuration. The instant method can be used to weave preforms with variable thickness or variable length/height legs that may be parallel or angled to each other in one or more planes. The preform can be woven using any convenient weave pattern, i.e., ply-to-ply, through thickness angle interlock, orthogonal, etc. While carbon fiber is preferred, the invention is applicable to practically any other fiber type, such as for example, glass, ceramic, aramid, polyethylene, polypropylene, stretch broken fibers such as stretch broken carbon (SBC), or combinations thereof.

Although exemplary embodiments described herein involve layer-to-layer interlocking, this is not necessary for the practice of the invention. Some of the layers of the preform may be without layer-to-layer interlocking. The preform can be woven using any convenient pattern for the warp fiber, i.e., ply-to-ply, through thickness angle interlock, orthogonal, etc. The preform according to the present invention is for mechanical or structural joints having a three-dimensional weave architecture with weft fibers woven to provide layer-to-layer interlocking of layers of warp fiber as well as interlocking of fibers within each layer. Although exemplary embodiments described herein involve layer-to-layer interlocking, this is not necessary for the practice of the invention. Some of the layers of the preform may be without layer to layer interlocking. The woven preform transfers out-of-plane loading through directed fibers to minimize inter-laminar tension. The preform has a base and one or more legs extending from the base, the base and one or more legs each having at least one layer of warp fibers. The outer ends of the base and/or the legs can have tapering edges formed from terminating layers of warp fibers in a stepped pattern, for example by cutting at an angle.

Typically, the preforms are woven using one type of fiber, for example, carbon fibers, for both the warp and weft fibers. However, preforms may also be weave patterns that use fibers/yarns made from multiple materials, such as carbon and glass fibers. These structures can result in preforms having higher toughness, reduced cost, and optimized thermal-expansion characteristics. The weave patterns can comprise all warp fibers of one material type and all weft fibers of another material type; or the weave may have warp and/or weft fibers of alternating types arranged, for example, in any pattern throughout the layers.

Thus by the present invention its objects and advantages are realized and although preferred embodiments have been disclosed and described in detail herein, its scope should not be limited thereby rather its scope should be determined by that of the appended claims.

What is claimed is:

1. A woven preform for use in reinforced composite structures, the preform comprising:
    a first layer of warp fibers;
    a second layer of warp fibers parallel to the first layer of warp fibers; and one or more layers of weft fibers,
    wherein the weft fibers are perpendicular to the warp fibers in the first layer and the second layer,
    wherein the weft fibers are interwoven with the warp fibers of the first layer and the second layer to form a multilayer preform having a base,
    wherein the warp fibers in the first layer exchange positions with warp fibers in the second layer to form a clevis of a predetermined width,
    wherein the warp fibers and the weft fibers are at an off axis or bias (non 0/90 degree) angle with respect to the clevis and an edge of the base of the perform.

2. The preform according to claim 1, further comprising two or more legs.

3. The preform according to claim 2, wherein the two or more legs are folded relative to the base, thereby forming upstanding legs.

4. The preform according to claim 3, wherein the two or more legs are separated by a zero or non-zero width clevis.

5. The preform according to claim 2, wherein the base has the same or more layers than each of the legs or vice versa.

6. The preform according to claim 2, wherein edges of the base and/or the legs are tapered.

7. The preform according to claim 2, wherein the legs are perpendicular or non-perpendicular or angled to the base.

8. The preform according to claim 2, wherein the legs are of equal or unequal lengths and/or heights.

9. The preform according to claim 2, wherein the legs are separated by a variable width clevis.

10. The preform according to claim 2, wherein the legs are linear or non-linear along a length of the perform.

11. The preform according to claim 1, wherein the warp and weft fibers are made of glass, carbon, aramid, polyethylene, polypropylene or combinations thereof.

12. The preform according to claim 1, wherein the preform is a Pi, 'T', 'H' or 'I' shaped perform.

13. The preform according to claim 1, wherein the off axis or bias angle is +/−45 degrees.

14. A method of forming a woven preform, the method comprising the steps of:
    providing a first layer of warp fibers;
    providing a second layer of warp fibers parallel to the first layer of warp fibers;
    and providing one or more layers of weft fibers, wherein the weft fibers are perpendicular to the warp fibers in the first layer and the second layer,
    interweaving the weft fibers with the warp fibers of the first layer and the second layer to form a multilayer perform having a base,
    wherein the warp fibers in the first layer exchange positions with warp fibers in the second layer to form a clevis of a predetermined width,
    wherein the warp fibers and the weft fibers are at an off axis or bias (non 0/90 degree) angle with respect to the clevis and an edge of the base of the perform.

15. The method according to claim 14, further comprising the step of cutting a predetermined length and width of the woven preform.

16. The method according to claim 15, further comprising the step of folding a portion of the woven preform on either sides of the clevis to form two or more upstanding legs.

17. The method according to claim 16, wherein the base has the same or more layers than each of the legs or vice versa.

18. The method according to claim 16, wherein edges of the base and/or the legs are tapered.

19. The method according to claim 16, wherein the legs are perpendicular or non-perpendicular or angled to the base.

20. The method according to claim 16, wherein the legs are of equal or unequal lengths and/or heights.

21. The method according to claim 16, wherein the two or more legs are separated by a zero or non-zero width clevis.

22. The method according to claim 16, wherein the legs are separated by a variable width clevis.

23. The method according to claim 16, wherein the legs are linear or nonlinear along a length of the preform.

24. The method according to claim 14, wherein the warp and weft fibers are made of glass, carbon, aramid, polyethylene, polypropylene or combinations thereof.

25. The method according to claim 14, wherein the preform is a Pi, 'T', 'H' or 'I' shaped preform.

26. The method according to claim 14, wherein the off axis or bias angle is +/−45 degrees.

* * * * *